United States Patent [19]
Chien et al.

[11] Patent Number: 5,852,733
[45] Date of Patent: Dec. 22, 1998

[54] MICROCONTROLLER DEVELOPMENT TOOL USING SOFTWARE PROGRAMS

[76] Inventors: Yung-Ping S. Chien, 723 W. Michigan St., Indianapolis, Ind. 46202; William D. S. Connor, 8969 S. McGray Dr., Pendleton, Ind. 46064-9541; Christopher D. Jeffares, P.O. Box 1007, Noblesville, Ind. 46061

[21] Appl. No.: 767,002

[22] Filed: Dec. 16, 1996

[51] Int. Cl.⁶ .............................. G06F 9/445; G06F 13/10
[52] U.S. Cl. ........................ 395/701; 395/703; 395/705; 395/707; 395/708; 395/710; 395/377
[58] Field of Search .................................. 395/375, 377, 395/701, 703, 705, 710, 707–708

[56] References Cited

U.S. PATENT DOCUMENTS

| | | | |
|---|---|---|---|
| 5,432,942 | 7/1995 | Trainer | 395/708 |
| 5,448,740 | 9/1995 | Kiri et al. | 395/708 |
| 5,485,615 | 1/1996 | Wennmyr | 395/702 |
| 5,572,195 | 11/1996 | Heller et al. | 340/825.35 |
| 5,574,894 | 11/1996 | Iles et al. | 395/555 |
| 5,574,917 | 11/1996 | Good et al. | 395/561 |
| 5,678,039 | 10/1997 | Hinks et al. | 707/4 |

OTHER PUBLICATIONS

Hurst, the review article for "Field Programmable Gate Array". A book by Oldfield et al., Microelectronics Journal, Vol. 28, Issue 1, Jan. 1997.

Masheleni et al. "Microcontroller–based charge controller for stand–alone photovoltaic systems", Solar Energy, vol. 61, No. 4, pp. 225–230, Jun. 12, 1997.

Salcic, "Protos—A microcontrollerFPGA–based prototyping system for embedded applications", Microprocessor & Microsystems vol. 21, pp. 249–256, 1997.

*Primary Examiner*—Emanuel Todd Voeltz
*Assistant Examiner*—Cuong H. Nguyen
*Attorney, Agent, or Firm*—Stanton Braden

[57] ABSTRACT

A software development tool is provided for Texas Instruments microcontrollers which provides register initialization, register information, and register editing in conjunction with Windows®-based forms generated by programs written according to well-known software programming languages. The editor function of the software development tool functions without the use of an emulator.

20 Claims, 9 Drawing Sheets

Figure 3

| Analog Input Channel Select (ADCTL Bits 0-2) |||| 
|---|---|---|---|
| These bits select the A/D channel measured during conversion. Channels should be changed only after the A/D has cleared the SAMPLE START and CONVERT START bits. Changing the channel when either of these bits are set to 1 invalidates the conversion in progress. ||||
| AD CTL Bit 2 | ADCTL Bit 1 | ADCTL Bit 0 | Channel |
| 0 | 0 | 0 | AN0 |
| 0 | 0 | 1 | AN1 |
| 0 | 1 | 0 | AN2 |
| 0 | 1 | 1 | AN3 |
| 1 | 0 | 0 | AN4 |
| 1 | 0 | 1 | AN5 |
| 1 | 1 | 0 | AN6 |
| 1 | 1 | 1 | AN7 |
| Close ||||

Figure 4

| Reference Voltage Select (ADCTL Bits 3-5) | | | |
|---|---|---|---|

These bits select the channel the A/D uses for the positive voltage reference. The reference voltage select bits must not change during the entire conversion.

| ADCTL Bit 5 | ADCTL Bit 4 | ADCTL Bit 3 | Vref Source |
|---|---|---|---|
| 0 | 0 | 0 | Vcc * |
| 0 | 0 | 1 | AN1 |
| 0 | 1 | 0 | AN2 |
| 0 | 1 | 1 | AN3 |
| 1 | 0 | 0 | AN4 |
| 1 | 0 | 1 | AN5 |
| 1 | 1 | 0 | AN6 |
| 1 | 1 | 1 | AN7 |

*Pin AN0 is unavailable as a positive voltage reference.

Close

MICROCONTROLLER DEVELOPMENT TOOL USING SOFTWARE PROGRAMS

BACKGROUND OF THE INVENTION

Programming microcontrollers can be quite time consuming given the register settings that must be pre-set prior to operating certain microcontroller modules. These pre-set settings generally refer to initialization of a microcontroller register. Register initialization can indeed become a very complex task especially considering the variety of microcontrollers on the market today which operate according to proprietary closed system architectures which need not be similar to competitor microcontroller products. Motorola markets the MCUinit® which is a visual development tool for a Window®'s based environment that generates initialization code for Motorola microcontrollers which functions either as a stand-alone program or as a register editor when connected to an emulator. In stand-alone mode, the MCUint's primary function is to generate initialization code for a Motorola controller. In this mode, registers are set with point and click commands which generate code for a Motorola proprietary programming language known as Macro Extension Language (MEL). MEL is placed in a Transcript Window as a series of commands which, in connection with a Code Generating dialog box, generates Motorola proprietary assembly language code for the Motorola microcontroller or C language code. The code generated by MEL is placed in a file which must be viewed and edited in connection with using a text editor separate from the MCUint. Consequently, the Motorola assembly language code or the C language code is not well disposed for easy display and manipulation since a user must manuever among a collection of files with a heavy reliance on using a separate text editor to combine portions of code in order to place initiation code in a selected location in a main program. Further, the only code which is readily visible using MCUinit is MEL code shown in the Transcript Window. This constrains a user to learn yet another proprietary language in order to receive full benefit from use of the MCUinit.

Since the stand-alone mode does not allow the user to place code at a selected location within a main program without having to employ the use of a text editor separate from the MCUinit application, additional time constraints are placed upon program development. In register editor-mode, it is possible to edit registers so as to input initialization information. However, using such a mode requires a significant amount of memory space given the use of MEL and the need to use an emulator.

A substantial market exists for microcontrollers manufactured by Texas Instruments Inc. Until now, no Windows-based register initialization programs were available. Further, no development tools previously were available which, in a Windows-based environment, were instructive as to the programming and function of important registers in Texas Instruments Inc. microcontrollers. Moreover, no such tools were previously available which were well disposed to readily allow a user to alter the development tool program to suit specific needs. Additionally, until now, no development tools were available that address the foregoing noted shortcomings of the prior art which allow register editing at a desired place in a main program using a development tool which permits code editting in a minimum amount of time.

ADVANTAGES OF THE INVENTION

The invention described herein provides advantages over the prior art which include the following:

1. Application creation which is easily customized by virtue of the invention's creation from widely known computer tools and applications.
2. Provision of a development tool which allows program development in a minimum amount of time in comparison with the prior art.
3. Provision of a register initialization development tool for the widely used Texas Instruments Inc. family of microcontrollers.
4. Operation which allows the placement, as selected by the user, of code within the main program.
5. Microcontroller programming time is substantially reduced.

SUMMARY OF THE INVENTION

A software development tool is provided for Texas Instruments Inc. microcontrollers which includes Windows®-based computer forms for editing and initializing registers. The computer forms are generated in conjunction with using widely used computer tools including software which is not proprietary to the microcontroller manufacturer. The software development tool is capable of generating computer code of a selected language which is operable to program selected microcontroller registers with predetermined information. This generated computer code can be inserted within a desired location in a main program for programming the microcontroller. Register information is programmed into the microcontroller registers without the use of an emulator.

BRIEF DESCRIPTION OF THE DRAWINGS

FIGS. 2 through 9 illustrate displays of selected dialog boxes associated with the register initialization associated with the A/D converter.

DETAILED DESCRIPTION OF THE INVENTION

Figure 1:
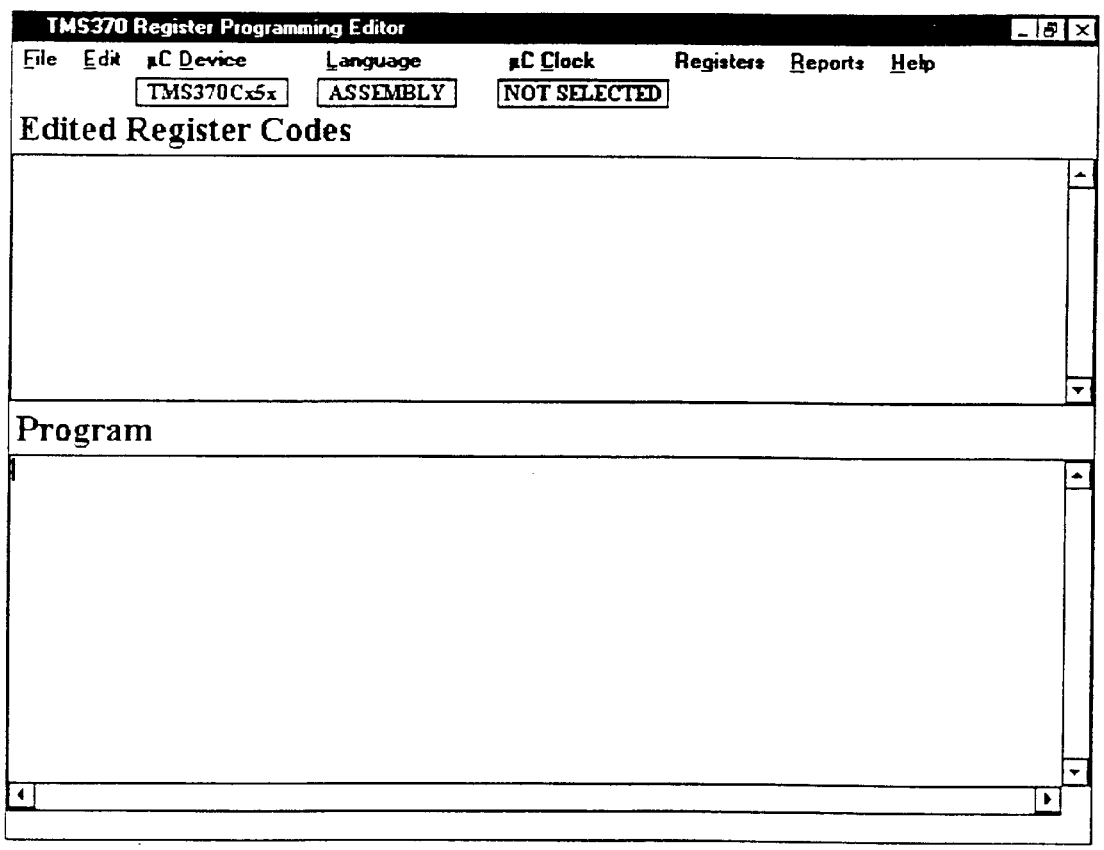
FIG. 1 provides a pull-down menu and dialogue box which are intended to assist a user in getting information on the use of the invention's software development tools for the TMS370 family of microcomputers.

The foregoing invention relates to a development tool to facilitate use including register initialization for a microcontroller; specifically, for the TMS370 family of Texas Instruments Incorporated (TI) microcontrollers.

The TMS370 family of microcontrollers comprises an integrated circuit with multiple peripheral functions in addition to a central processing unit (CPU), memory and input/output (I/O) blocks. Typically, the TMS370 families have the following architectural elements built from standard modules which include, CPU, register file RAM data EEPROM, program memory, input/output ports, timer 1, timer 2n, watchdog timer, programmable acquisition and control timer, serial communications interfaces, serial peripheral interface, and analog-to-digital converter modules. A brief description of these features follows.

CPU

The TMS370 8-bit CPU has a status register, a program counter register, and a stack pointer. The CPU uses another feature, the register file, as working registers, access on the internal bus in one bus cycle. The 8-bit internal bus also allows access to memory and to the peripheral interfaces.

REGISTER FILE

The register file is located at the beginning of the TMS370 memory map. Register-access instructions in the TMS370 instruction set allow access to any of the first 256 registers in one bus cycle. The register file is used as general purpose random access memory (RAM) and contains the stack.

RAM

Ram modules other than those contained in the register file are mapped after the register file.

DATA EEPROM

The data EEPROM modules provide in-circuit programmability and data retention in power-off mode. This memory is useful for constants and infrequently changed variables required by the application program. The EEPROM can be programmed and erased by using available EEPROM programmers or by the TMS370 while under the control of a program.

PROGRAM MEMORY

The program memory includes memory modules of 2 kilobytes to 48 kilobytes of memory. Depending upon the TMS370 family member, these modules are either erasable programmable read only memory (EPROM) (so as to be suitable for prototyping applications) or mask ROM (for large volume production) which is factory programmed.

INPUT/OUTPUT PORTS

Varying numbers of I/O ports of various port widths are provided for TMS370 family members. Some of these ports can be configured as digital input or digital output. Ports are labeled A, B, C, etc.

TIMER 1

Timer 1 is a 16-bit timer which is configurable as a programmable 8 bit prescaler that determines the independent clock sources for the general-purpose time and the watchdog time; a 16 bit event timer for keeping a cumulative total of the transitions; a 16 bit input-capture function that latches the counter value on the occurrence of an external input; a 16 bit pulse accumulator for measure the pulse input width; a self-contained pulse-width modulated output control function; or two 16 bit compare registers that trigger when the counter matches the contents of a compare register. Timer 1 can be used to generate an interrupt to the CPU, set flag bits reset the timer counter, toggle an I/O line or generate a pulse-width modulated outputs.

TIMER 2n

Timer 2n is the term representative of either Timer 2A or Timer 2B. These timers can be configured as independent clock sources for the general purpose timer; a 16-bit event timer for keeping track of the number or cumulative transitions; a 16-bit pulse accumulator to measure the input pulse duration; a pulse-width modulated output controller; and two 16 bit compare registers for triggering when a counter matches with the contents of a compare register. Like timer 1 these registers can generate interrupts, set flag bits, toggle I/O, reset the timer counter or generate pulse-width modulate outputs.

WATCHDOG TIMER

The watchdog timer can function to ensure system integrity. It can be programmed to generate a hardware reset when its timer times out, thereby serving as a hardware monitor over the software to avoid losing a program. The watchdog timer can also function as a general-purpose timer.

PROGRAMMABLE ACQUISITION AND CONTROL TIMER

The programmable acquisition and control timer (PACT) is a programmable timing module that uses on-chip RAM to store its commands as well as its timer values. The PACT module acts as a timer coprocessor by gathering timing information on input signals sand controlling outputs signals with little or no intervention by the CPU.

SERIAL COMMUNICATIONS INTERFACES

SCI1 and SCI2 comprise the serial communications interfaces. These are two built-in serial interface modules that are programmable I/O ports that facilitate digital communications between the TMS370 device and other asynchronous peripherals. SCI1 and SCI2 each include a transmitter and a receiver which transmit and receive data, respectively, one bit at a time at a programmable bit rate.

SERIAL PERIPHERAL INTERFACE

The serial peripheral interface, SPI, is a module that serves as a built-in serial interface which facilitates communications between the network master, slave CPUs and external peripheral devices. The SPI allows a serial bit stream of programmed length to be shifted into and out of the microcontroller at a programmed bit -transfer rate. This rate can be set-up for high speeds. Typically, the SPI is used for communications between the microcontroller and external peripherals or another microcontroller. The SPI is set up by software, after which the CPU takes no part in timing, data format, or protocol.

ANALOG-TO-DIGITAL CONVERTER MODULES

ADC1, ADC2, and ADC3 are analog-to-digital converter (A/D) modules which provide successive approximated analog-to-digital conversion of data.

Typical applications for the TMS370 family of microcontroller devices are as follows: 1) Automobile climate control systems, automobile cruise control systems automobile entertainment systems, automobile instrumentation, automobile navigation systems, automobile engine control systems, automobile antilock braking systems, automobile body controllers; 2) Computer keyboards, computer peripheral interface control, computer disk controllers, computer terminals, computer tape drives; 3) industrial motor control, industrial temperature controllers, industrial process control, industrial meter control industrial medical instrumentation, industrial security systems; and 4) modems, intelligent phones; intelligent line card control for communications, telecopiers, and debit cards.

The afore described architectural elements of the TMS370 family of devices require that certain bits be set in order to specify a given functionality as determined by the control registers according to a predetermined program format for the element. This initialization can be accomplished using the TMS370 assembly language or using ANSI C (e.g. including C++ or other variations of C) in conjunction with the TMS370 family's C compiler. The invention makes the process of register initialization much less time-consuming, especially considering the invention's graphical user interface for providing, in a Windows® based environment, forms, register designation assignment listings, and icons. Use of the TMS370 family of microcontrollers is more easily facilitated by the invention as shown by FIG. 1 which illustrates a computer screen display Window of a form from the register programming editor provided by the invention entitled, "TMS370 Register Programming Editor." The form of FIG. 1 provides a graphical user interface in which the programming code for the microcontroller is entered in the space below the title, "Program." Note that standard click-on positioning cursors are illustrated in FIG. 1 and these cursors are used in conjunction with displaying and entering information. In FIG. 1, the display includes a Windows®menu bar with the following entries which each provide a pull-down menu with options: File, Edit, $\mu$C Type (microcontroller type), Language, $\mu$C Clock (microcontroller Clock), Registers, Reports, Help. As with a typical Windows® display, the File menu entry includes the pull-down option of opening a new file or an existing file. The Edit option from the menu bar includes the feature of copying code, (which can be provided by conversion of register initialization information to C language code or assembly language code in conjunction with using dialog boxes associated with the Registers menu bar options) from the "Edited Register Codes" section of the TMS370 Register Programming Editor to the "Program" section of this Editor. This is accomplished by selecting "Copy" and "Paste" selections from the pull-down menu of the Edit option. In this manner, a powerful aspect of this invention is accomplished by being able to insert register initialization information anywhere within the main program for the microcontroller. Because of the invention's ability to "Paste" code into a main program, it is not neccessary to input code into the microcontroller with an emulator, a development tool which emulates the operation of the microcontroller. The microcontroller type is selected from the options of the pull-down menu associated under the $\mu$C Type entry which include the specific microcontroller devices in the family of TMS370 microcontrollers. Language options include the TMS370 assembly language or the C language. The microcontroller system clock speed under the $\mu$C Clock entry is selected in conjunction with a dialog box which allows the input of a desired clock speed. The Reports option from the menu bar generates a dialog box which allows a printed report of the latest register settings. This printed report reflects the assembly language register name (ASM identity), and the C language register name (C Identity) for the specified register as well as the latest bit values for the register. A sample of a portion of this report (with arbitrary bit settings) is shown below.

Latest Register Settings
18 MAY 96

| ASM Identity | C Identity | Bits | | | | | | | |
|---|---|---|---|---|---|---|---|---|---|
| | | 7 | 6 | 5 | 4 | 3 | 2 | 1 | 0 |
| 1022h | ADATA | 0 | 0 | 0 | 0 | 0 | 0 | 0 | 0 |
| 1070h | ADCTL | 1 | 1 | 1 | 1 | 1 | 1 | 1 | 1 |

The Help option from the Menu bar shown in FIG. 1 provides a pull-down menu and dialogue box which are calculated to assist a user in getting information on the use of the invention's software development tools for the TMS370 family of microcomputers. The Registers entry from the menu bar shown in FIG. 1 prompts a pull-down menu with entry options which prompt further pull-down menus concerning register initialization options such as System Reset, System Control, Digital I/O, External Interrupt Control, Data EEPROM Control, Program EPROM Control, Timer 1, Timer 2, Serial Communication Interface, Serial Peripheral Interface and Analog-to-Digital Converter. These register initialization options cover substantially all of the register initialization aspects involved with programming devices in the TMS370 family. Register initialization is accomplished by pulling-up on-screen display forms which are used to program bits in a register. Dialog boxes associated with the pull-down menus allow the register settings to be converted to the selected language (using the language selected in conjunction with the Language menu entry) by clicking on a save button presented in the dialogue box. The initialization code according to the specified language is placed in "Edited Register Codes" section of the TMS Register Programming Editor window of FIG. 1. In conjunction with the register initialization, dialog boxes provide a description of substantially all bits within a register. In its preferred embodiment, the invention strives to maintain as much similarity among display forms as possible in order to increase user familiarity with the operation of the invention. Further, dialog box buttons should provide information which is as descriptive and concise as possible.

A better understanding of the Register initialization aspects of the invention can be gleaned from FIGS. 2 through 9 which illustrate displays of selected dialog boxes associated with register initialization associated with the A/D converter. Register initialization with one of the analog-to-digital modules shall be examined below. Analog-to-digital module ADC1 is initialized by setting the Analog Control Register, ADCTL. Analog Control Register, ADCTL, is organized according to chart 1.

Chart 1

| Analog Control Register (ADCTL) | | | | | | | |
|---|---|---|---|---|---|---|---|
| Bit 7 | Bit 6 | Bit 5 | Bit 4 | Bit 3 | Bit 2 | Bit 1 | Bit 0 |
| Convert Start | Sample Start | REF Volt | REF Volt | REF Volt | AD INPUT | AD INPUT | AD INPUT |

Bits 0 through 2 control the selection of the input pin on which the analog data for conversion will be used. These input pins serve as selection channels to the ADC1 on which the analog data is provided to ADC1 for conversion of that data from an analog value to a digital value for output of that digital value to data register ADDATA. There are 8 possible input pins which can serve as channels, consecutively numbered and preceded by the designation "AN," e.g., AN0 through AN7.

Figure 2:
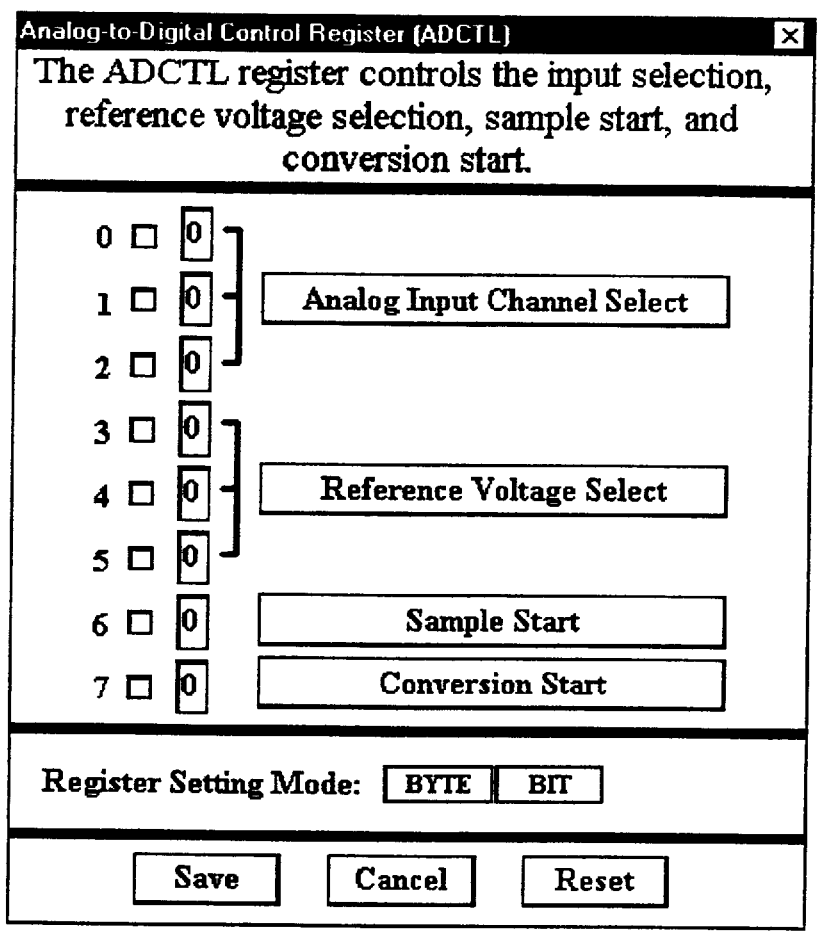

FIG. 2 illustrates the dialog box display which can be used to initialize the ADCTL register. This dialog box display serves as a form by which the ADCTL register is programmed. A brief explanation of the register is displayed at the top of the form. A brief explanation of the associated register is generally found on all forms associated with the invention. As shown in FIG. 2, bits which are numerically labeled 0 through 7 can be set (to logic one value) or cleared (logic zero) according to the register setting mode, bit mode or byte mode, selected as displayed in binary form in the dialog box. In byte mode, the bit values are displayed in the larger box following the numerical bit label. Clicking the smaller box (which is a button in the dialog box) which follows numerical bit label will change the binary state shown in the larger box. Bits are set with a logic 1, the result of which is manifested by an "x" being displayed in the smaller box. In byte mode, the "set" and "clear" buttons are displayed. "Set" is the logical OR function while "clear" is the logical AND function. The database is not updated in byte mode. Most registers associated with the invention are 8 bit. Register modes are not needed on 16 bit register display forms of the invention since 16 bit registers are concerned with display counters or frequency. Registers in bit mode are overwritten depending on the input of the user. Also in this mode the large box which follows the numerical label in byte mode is not shown. The "set" and "clear" buttons determine the functionality of bit buttons: namely, an individual bit is set equal to logic one by the "set" button while an individual bit is cleared to logic zero by the "clear" button. Buttons, such as those shown in FIG. 2, (AD Input Select, REF Volt Select, Sample Start and Convert Start) are associated with each bit of a register, which when clicked-on, present an information dialog box explaining the functionality of the register bit value. This practice of having a button in conjunction with an information dialog box is followed for each register initialization display of the invention. Collectively, activation of these buttons will result in an explanation of the functionality of each register bit. This serves as a learning tool for using the TMS370 family of microcontrollers. It further obviates the need to rely as much, in connection with programming the microcontroller, on one's memory or the user's manual associated with the microcontrollers. At the lower portion of the display in FIG. 2, three buttons are displayed which are common to many of the forms presented for register initialization. These buttons are "Save," "Cancel," and "Reset." The "Save" button, when activated, converts the entered registered data on the form into the selected language under the Edited Register Codes section of the Register Programming Editor form illustrated in FIG. 1. The "Cancel" button clears the register initialization form of the values entered, and the "Reset" button clears the register bit values.

Chart 2 identifies the bit settings for bits 0 through 2 of the Analog Control Register corresponding to channels AN0 through AN7.

Chart 2

Channel Selecting Bit Settings for the ADCTL Register

| Bit 2 | Bit 1 | Bit 0 | Channel |
|---|---|---|---|
| 0 | 0 | 0 | AN0 |
| 0 | 0 | 1 | AN1 |
| 0 | 1 | 0 | AN2 |
| 0 | 1 | 1 | AN3 |
| 1 | 0 | 0 | AN4 |
| 1 | 0 | 1 | AN5 |
| 1 | 1 | 0 | AN6 |
| 1 | 1 | 1 | AN7 |

FIG. 3 illustrates the information dialog box display associated with the AD Input Select button shown in FIG. 2. This form gives a function explanation, as is illustrated along with the proper settings corresponding to the channel selection for the ADCTL register control. Desired settings can be implemented by buttons "AN0" through "AN7" which provide one-touch selection (as opposed to individually setting each bit of the register corresponding to the button illustrated) of the registers associated with the input selection. A "Close" button is provided with this box which will return the user to the ADCTL register display dialog box of FIG. 2.

The analog-to-digital conversion proceeds according to the formula specifying the calculated digital value as being 255 ($2^8-1$) times the ratio of the input voltage to a reference voltage. Analog Control Register, ADCTL uses a positive voltage reference provided by either one of the input channels, AN0 through AN7 or through an analog voltage supply pin to the microcontroller, pin $V_{CC3}$. On most members of the TMS370 family, Bits 3 through 5 specify the reference voltage source according to Chart 3 below.

Chart 3

Bit Settings to Specify
Analog-to-Digital Conversion Reference Voltage Source

| Bit 5 | Bit 4 | Bit 3 | Reference Voltage Source |
|---|---|---|---|
| 0 | 0 | 0 | $V_{CC3}$ |
| 0 | 0 | 1 | AN1 |
| 0 | 1 | 0 | AN2 |
| 0 | 1 | 1 | AN3 |
| 1 | 0 | 0 | AN4 |
| 1 | 0 | 1 | AN5 |
| 1 | 1 | 0 | AN6 |
| 1 | 1 | 1 | AN7 |

FIG. 4 illustrates the dialog box display associated with the REF Volt Select button of FIG. 2. As shown, the bit settings for the source of reference voltage sources can be set by activation of the Vref Source buttons illustrated. This form contains a brief self-explanation as well as a "Close" button.

Setting bit 6 of the ADCTL register specifies stopping any ongoing analog-to-digital conversion and starting sampling the selected input channel for a new analog-to-digital conversion.

Bit 7 of the ADCTL register, when set, starts the analog-to-digital conversion.

AN0 through AN7 can also be configured as digital input pins which function as a general purpose input for the microcontroller rather than being inputs for the A/D converter ADC1. Analog Port E Enable Register, ADENA, sets any of AN0 through AN7 as a general purpose input when a corresponding bit is set to one. Chart 4 illustrates the bits corresponding to the AN0 through AN7 for the bits of Register ADENA.

Chart 4

| Register ADENA | | | | | | | |
|---|---|---|---|---|---|---|---|
| Bit 7 | Bit 6 | Bit 5 | Bit 4 | Bit 3 | Bit 2 | Bit 1 | Bit 0 |
| AN7 | AN6 | AN5 | AN4 | AN3 | AN2 | AN1 | AN0 |

Figure 5:
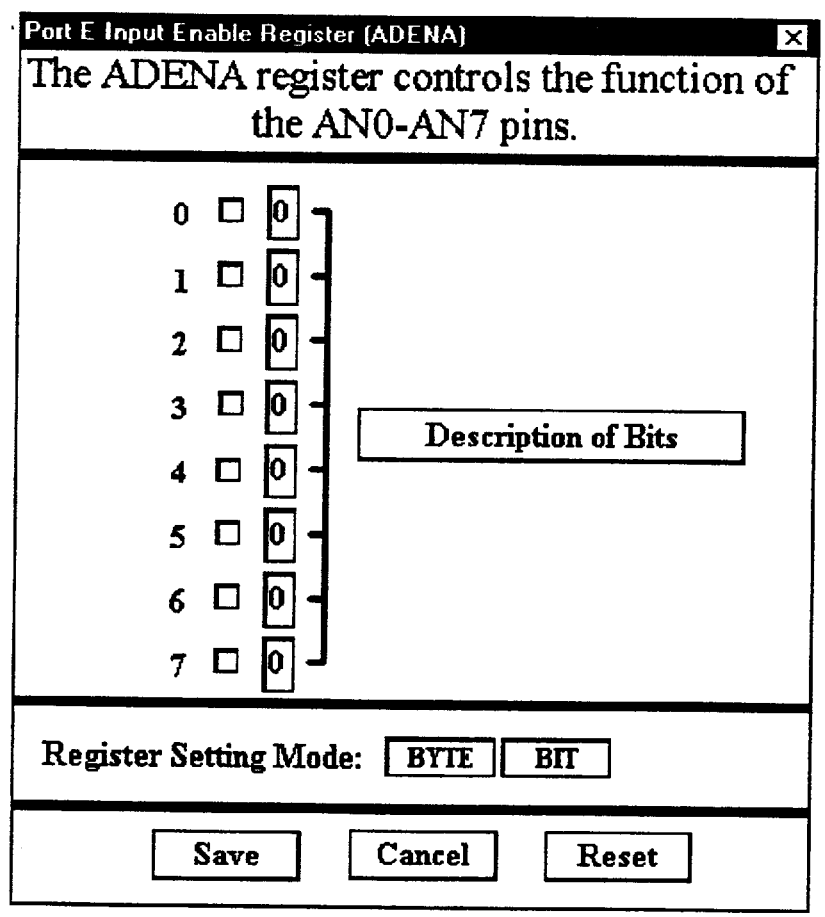

FIG. 5 illustrates the dialog box display which serves as the form for setting the ADENA register. A description of the form is provided at the top of the form as shown and an information button (Description of Bits) is provided to detail the functionality of the bit settings. The previously described Register Setting Mode option along with the previously described "Save" (for code conversion on to the Edited Register Codes section of the display of FIG. 1), "Cancel" and "Reset" buttons are provided on this form.

ADC1 control registers also include the Analog Status and Interrupt Register, ADSTAT. Bits 0, 1, and 2 can be programmed while bits 3 through 7 are reserved. Chart 5 illustrates the settings for register ADSTAT.

Chart 5

| Register ADSTAT | | | | | | | |
|---|---|---|---|---|---|---|---|
| Bit 7 | Bit 6 | Bit 5 | Bit 4 | Bit 3 | Bit 2 | Bit 1 | Bit 0 |
| — | — | — | — | — | AD Ready | AD Int Flag | AD INT ENA |

Bit 2 is set by the ADC1 whenever the ADC1 is ready for a new A/D conversion and a conversion is not in progress. Bit 0 is the ADC1 interrupt enable. When this bit is set to 1, it allows the ADC1 to generate an interrupt, otherwise setting this bit to zero disables the ADC1 from generating an interrupt. Bit 1 is the ADC1 interrupt flag which is set by ADC1 at the end of an A/D conversion. An interrupt request is generated if this bit is set while bit 0 is set to 1.

Figure 6:
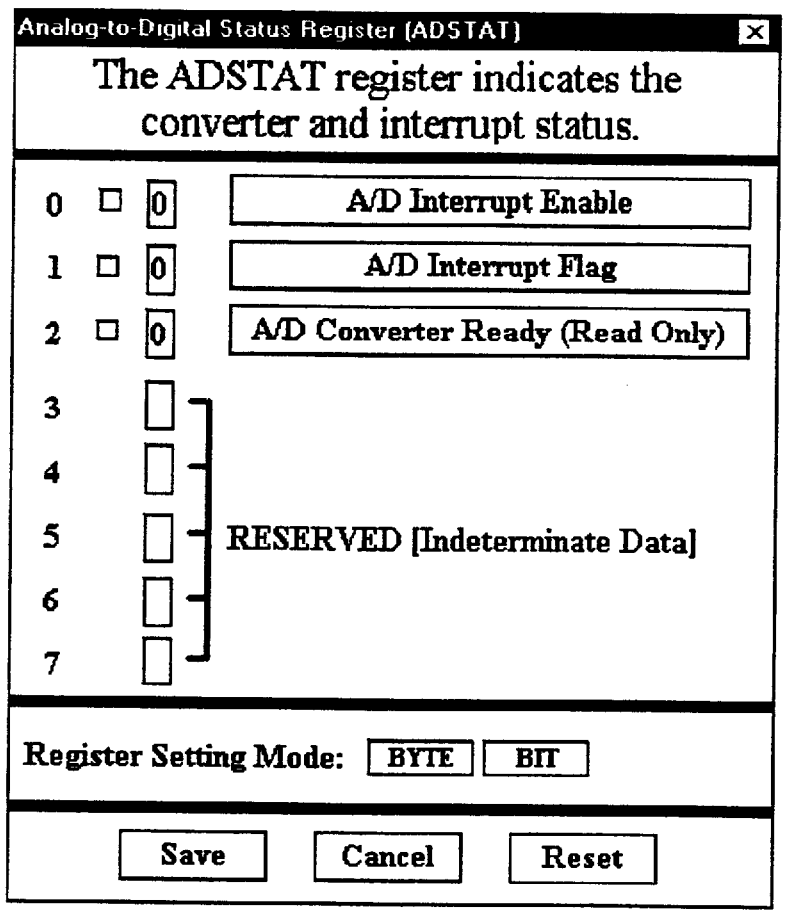

FIG. 6 illustrates the dialog box display which provides the form for setting the ADSTAT register. As shown, buttons (AD INT ENA, AD INT Flag, and AD Ready (Read Only)) are provided which serve to explain the functionality of the configurable register bits. This form includes the previously described Register Setting Mode and "Save," "Cancel" and "Reset" buttons.

The priority level of the ADC1 interrupt is set by the Analog Interrupt Priority Register (ADPRI). Chart 6 below is representative of the ADPRI register functions.

Chart 6

| | | Register ADPRI | | | | | |
|---|---|---|---|---|---|---|---|
| Bit 7 | Bit 6 | Bit 5 | Bit 4 | Bit 3 | Bit 2 | Bit 1 | Bit 0 |
| AD STEST | AD Priority | AD ESPEN | — | — | — | — | — |

Bit 7 (AD STEST) must be set equal to 0 for proper operation of the interrupt priority level of the ADC1 interrupt. The ADC1 interrupt is of a higher priority when bit 6 is set to 1. Otherwise, a bit 6 value of 0 places the ADC1 interrupt at a lower priority. Bit 5 operates in conjunction with the TMS370 family's emulator which is typically used to debug a program. When bit 5 is set to 1, the emulator is suspended and the operation of the ADC1 is stopped so as to allow examination of its state at the point of the emulator suspension. Bits 0 through 4 are reserved.

Figure 7:
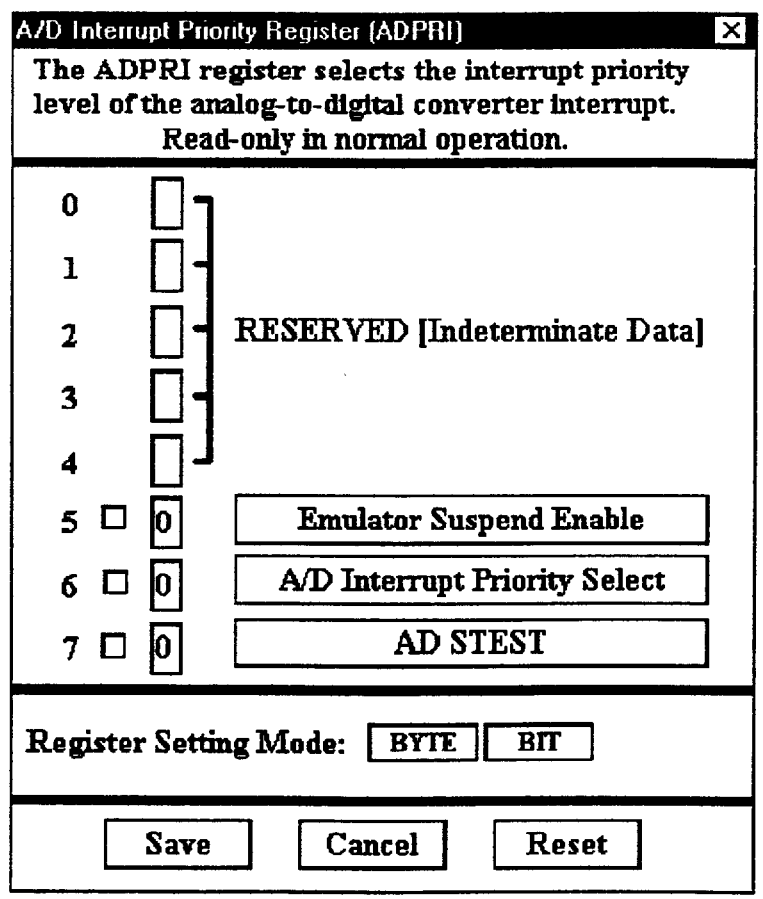

FIG. 7 illustrates the dialog box display which serves as the form for setting the ADPRI register. A brief explanation of the ADPRI register is illustrated at the beginning of the form as shown. Buttons AD ESPEN, AD Priority, and AD STEST, when activated, explain the functionality of the associated register bit. The Register Setting Mode buttons and "Save," "Cancel," and "Reset" buttons, as previously described are provided by this form.

When one or more of the input bits AN0 through AN7 are configured as general purpose, digital inputs, register ADIN shows the data present at input pins so configured. Pins configured as ADC1 channels are read as 0s from this register. Chart 7 shows the corresponding bit and input pin information for register ADIN.

Chart 7

| | | | Register ADIN | | | | |
|---|---|---|---|---|---|---|---|
| Bit 7 | Bit 6 | Bit 5 | Bit 4 | Bit 3 | Bit 2 | Bit 1 | Bit 0 |
| Data AN7 | Data AN6 | Data AN5 | Data AN4 | Data AN3 | Data AN2 | Data AN1 | Data A0 |

Figure 8:
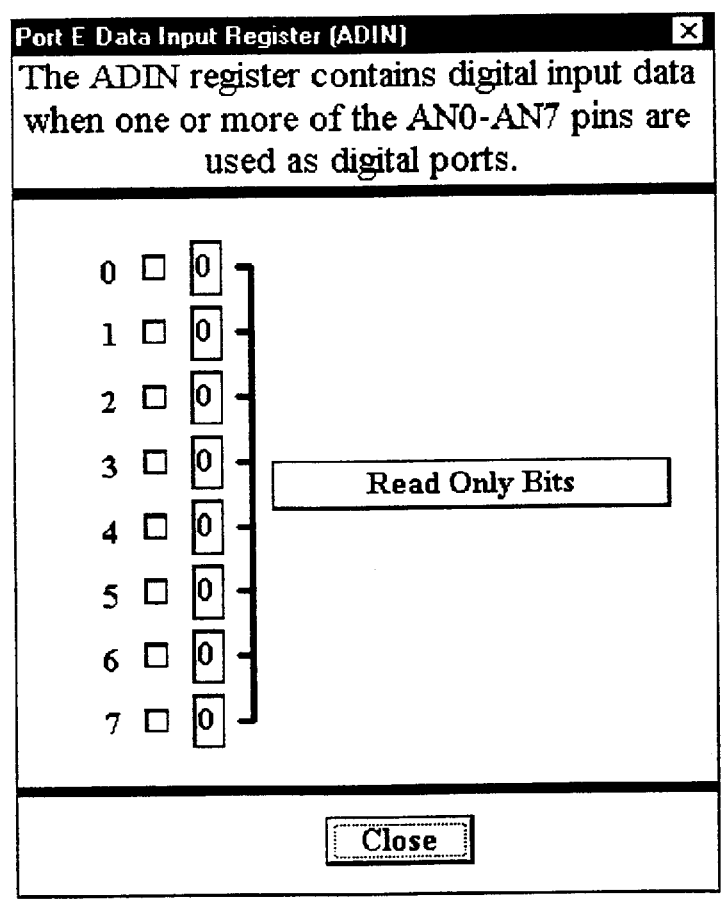

FIG. 8 illustrates the corresponding dialog box display for the ADIN register. As illustrated by this "Read Only Bits" button, this display serves to allow a visual inspection of the contents of the ADIN register since bits 0 through 7 are not programmed in conjunction with this form. The "Read Only Bits" button provides an information dialog box explaining the ADIN register. A "Close" button at the bottom of this display closes the ADIN dialog box upon activation of the button.

Figure 9:
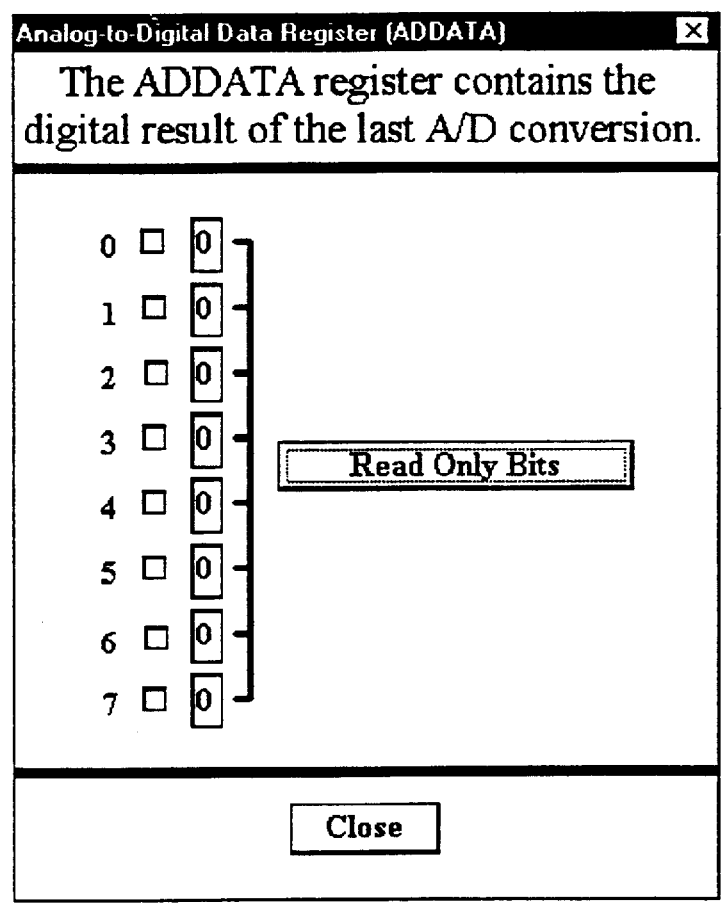

As indicated above, the results of the A/D conversion are placed in register ADDATA. FIG. 9 illustrates a dialog box display form which serves to provide a visual inspection of the ADDATA register. In addition to the brief explanation of the ADDATA register at the beginning of this form, a "Read Only Bits" button, when activated, provides further information on the ADDATA register. A "Close" button, when activated, closes the dialog box.

The foregoing described interactive display forms and report are most effectively implemented with object-oriented graphics in conjunction with an object-oriented interface using a object-oriented programming language. In the invention's preferred embodiment, Microsoft®'s Visual Basic® 4 programming language is the programming language of choice to implement the display forms. Visual Basic® 4 provides event-driven programming. Therefore, rather than writing a computer program that plots out every step in precise order, the programmer writes a program that responds to the user's action-e.g., choosing a command, clicking an icon in a window, moving the mouse (as is the case with the foregoing described A/D converter ADC1). Further, rather than the programmer writing a single large program, the programmer creates an application that is a collection of cooperating miniprograms triggered by user-initiated events, thereby allowing forms to be created according to the invention with great speed and ease. This events-driven programming is most suitable for a Windows® environment. As an example, the Visual Basic® code for the commonly used form functions such as, "Save," "Cancel," "Reset," and the Register Setting Mode selection is given below. This code is contained in a file named REGCMDS.BAS. The REGCMDS.BAS file is a collection of global variables and common subroutines used by the register editing display forms. The variables declared are register form initialization status, oscillator frequency, bit setting modes, register form number (for system reset routine), programming language, register window display mode, report data (name & type), output comment arrays, SCI automatic bit set enable, and timer function mode. The main function of the global variables is to transfer information about program states (i.e. EqualMode) and universal data (e.g. OscFreq) between program routines and forms. The primary functions of the subroutines included in the REGCMDS.BAS file can be summarized as involving form initialization (InitRegSetForm, SetEQUAL, SetBitMode, SetAND, SetOR, and DisplayLines), register bit data transfer & recording (ExecSAVE, RegSAVE, RegDEFAULT, and RegSave16Bit), and output code comment function servicing (PlaceCommentintoCode, CalculateComment, PlaceCommentintoCode16Bit, CalculateComment16Bit). The included subroutines are as follows:

InitREGSETFORM calls the SetEQUAL routine when a register editing display form is called from the main menu. This subroutine eliminates nuisance re-initializations of the register editing form after a sub-form to the register editing form closes.

SetEQUAL sets up the register editing display form for changing all eight bits of the register. It also tells the RegSAVE routine to write statements that affect all eight bits.

SetBitMode sets up the register editing form for changing individual bits of the register. Its primary function is disabling the bytewise editing functions (negate SETEQUAL).

SetAND enables writing of zeros in bit mode editing. The selected bits on the register editing form are changed to zeros using an AND statement & mask as output code.

SetOR enables writing of ones in bit mode editing. The selected bits on the register editing form are changed to ones using an OR statement & mask as output code. SetEQUAL, SetAND & SetOR functions are exclusive of each other.

ExecSAVE prevents execution of the RegSAVE routing when none of the SetOR, SetAND, or SetEQUAL functions is enabled. This can occur if SetBitMode is selected without specifying AND (SetAND) or OR (SetOR) functions. An error message is shown if RegSAVE cannot be executed.

RegSAVE performs bit or byte changing operations according to the selected mode (SetEQUAL, SetAND, or SetOR). It then saves the result to the database and outputs appropriate code with comments from the PlaceCommentintoCode subroutine.

RegDEFAULT copies the TMS370 default reset bit values to the checkboxes on the register editing form. These default values are read from the database.

DisplayLines shows or hides selected lines on a register editing form. Affected lines typically group sets of bits in a register. This routine is used for hiding RESERVED group lines in bit setting modes.

RegSave16Bit functions like RegSAVE except it affects 16-bit registers. Only EqualMode register setting mode is available with this routine.

Place CommentintoCode retrieves appropriate comments form the database and sends them to RegSAVE for printout on the Edited Register Codes window. In some cases it calls CalculateComment to get calculated values for comments.

CalculateComment calculates values from selected bits in a register according to keywords in the comment section of the database. When the "CALC:" prefix is encountered in the database, CalculateComment is called. The next two numbers after "CALC:" specify the register bit range. Six or seven characters after the bit range specify the calculation type; these are "ClkSrc" (Timer), "CharLen" (SPI, SCI), "ClkFrq" (SPI), "ChanSel" (A/D), and "VrefSrc" (A/D). Characters listed after a quotation mark at the end of "ClkSrc" & "CharLen" statements are shown at the beginning of the comment in the output code.

PlaceCommentintoCode16Bit functions like PlaceCommentintoCode except that it is for 16-bit registers. These 16-bit registers include timer counters serviced by the Tcounter form (for register control of a 16-bit free-running, read-only counter) and the SCI (serial communications interface) baud rate serviced by the SCIBaud form.

CalculateComment16Bit provides register values or time period equivalents to the PlaceCommentintoCode 16Bit subroutine. This routine is always called for by 16-bit registers.

ShowinitOutCode shows the required initialization code in the Edited Register Codes window before the first line of programming code is output in that window.

The source code for the REGCMDS.BAS file is given below. Program comments are set-off in by a single quote (') prior to the comment. Attribute VB Name="RegFormCmds"

'** Register Setup Form Initialization Flag **
Global InitRegVars As Boolean '** ⁄C Oscillator Frequency **
Global OscFreq As Single '** Logic Mode Variables **
Global EqualMode As Boolean
Global ANDMode As Boolean
Global ORMode As Boolean '** Register Form Select **
Global RegFormIDNumber As Integer '** Selectable Dual Database Line Form Flag **
Global AltComment As Boolean '** Language Select **
Global AsmEnable As Boolean '** Register Editor Startup Output Code Display Status **
Global StartupCodeShown As Boolean '** Report variables **
Global Output_File_Name
Global Output_File_Type '** Output Code Comment Arrays **
Global OutputCodeComment(0 To 7) As String

Page 22

Global OutputCodeComment16Bit(0 To 15) As String

'** SCI Baud Rate variable **
Global AutoSet As Boolean

'** Timer Module Mode variable **
Global CompareMode As Boolean

Public Sub InitRegSetForm(FormID As Form)
    'FormID.Top = 315         'Set the default form location.
    'FormID.Left = 3435       (For later use.)

If InitRegVars Then       'Call the initialization
      SetEQUAL FormID       'subroutine if the register
      InitRegVars = False    'setup form is called from
    End If                'the RegEdit menu.
End Sub Public Sub SetEQUAL(FormID As Form)  '*******************************
                     '*   This also serves as the   *
                     '*  initialization routine for *
                     '*  register setup forms.    *
                     '*******************************

EqualMode = True         'Select BYTE SET mode.

FormID!Reset.Enabled = True    'Enable RESET button.

```
FormID!ByteMode.BackColor = &HFFFF00     'Emphasize BYTE SET button.
FormID!BitMode.BackColor = &HC0C0C0

FormID!SelectSet.Visible = False         'Hide SELECT SET & SELECT CLEAR
FormID!SelectClear.Visible = False       'buttons.

For i = 0 To 7                           'Make database bits visible.
    FormID!SavedBit(i).Visible = True
Next i
                                         'Preset checkboxes to database
For i = 0 To 7                           'values.
    FormID!NewBit(i).Value = FormID!SavedBit(i).Text
Next i
End Sub Public Sub SetBitMode(FormID As Form)
    EqualMode = False                    'Select BIT SET mode.

ANDMode = False                      'Initialize BIT SET option
    ORMode = False                       'variables.

FormID!Reset.Enabled = False         'Disable RESET button.

FormID!ByteMode.BackColor = &HC0C0C0 'Emphasize BIT SET button.
    FormID!BitMode.BackColor = &HFFFF00

FormID!SelectSet.BackColor = &HFF    'Reset SELECT SET & SELECT
    FormID!SelectClear.BackColor = &HFF  'CLEAR colors to default.
    FormID!SelectSet.ForeColor = &HFFFFFF
```

Page 24

```
FormID!SelectClear.ForeColor = &HFFFFFF

FormID!SelectSet.Visible = True        'Show SELECT SET & SELECT CLEAR
FormID!SelectClear.Visible = True      'buttons.

For i = 0 To 7                         'Make database bits invisible.
    FormID!SavedBit(i).Visible = False
Next i For i = 0 To 7                         'Preset checkboxes to blank (0).
    FormID!NewBit(i).Value = 0
Next i
End Sub Public Sub SetAND(FormID As Form)
    ANDMode = True                     'Set mode variables accordingly.
    ORMode = False FormID!SelectClear.BackColor = &HFFFF00    'Set mode button colors to
    FormID!SelectSet.BackColor = &HC0C0C0      'highlight CLEAR function.

FormID!SelectClear.ForeColor = &H0
    FormID!SelectSet.ForeColor = &H0
End Sub

Public Sub SetOR(FormID As Form)
    ANDMode = False                    'Set mode variables accordingly.
    ORMode = True
```

Page 25

```
    FormID!SelectClear.BackColor = &HC0C0C0    'Set mode button colors to
    FormID!SelectSet.BackColor = &HFFFF00      'highlight SET function.

FormID!SelectClear.ForeColor = &H0
    FormID!SelectSet.ForeColor = &H0
End Sub

Public Sub ExecSAVE(FormID As Form)

'This function checks for an
                           'undefined Bit Mode operation.
                           'If Bit Mode is selected without
                           'enabling Set or Clear, it warns
                           'the user of this condition.

MsgBox "Or Mode = " + Str$(ORMode) + "AND Mode = " + Str$(ANDMode) +
"EQUAL Mode = " + Str$(EqualMode)

If Not EqualMode And Not ORMode And Not ANDMode Then
        MsgBox "The program is in Bit Change Mode.  Select one of the red buttons for
SETTING or CLEARING the chosen bits.", 0 + 16, "IMPROPER SAVE OPERATION"
    Else
        RegSAVE FormID
    End If
End Sub Public Sub RegSAVE(FormID As Form)
    Dim OutCodeTemp As String             'Temporary output code variable.
```

```
Dim FirstLine As Boolean            'First line of comments.
Dim CodeListed As Boolean ShowInitOutCode                     'show initialization code, if needed.

MsgBox "Or Mode = " + Str$(ORMode) + "AND Mode = " + Str$(ANDMode) +
"EQUAL Mode = " + Str$(EqualMode)

If ANDMode Then                  'Invert bits for AND mode.
      For i = 0 To 7
         If FormID!NewBit(i) = 1 Then
            FormID!NewBit(i) = 0
         Else
            FormID!NewBit(i) = 1
         End If
      Next i
   End If LSHex = 0                        'Convert results to hex numbers.
   MSHex = 0
   For i = 0 To 3
      LSHex = LSHex + Str$(FormID!NewBit(i) * 2 ^ i)
      MSHex = MSHex + Str$(FormID!NewBit(i + 4) * 2 ^ i)
   Next i
```

Page 27

```
If MSHex > 9 Then
   MSHex = MSHex + 55
Else
   MSHex = MSHex + 48
End If
If LSHex > 9 Then
   LSHex = LSHex + 55
Else
   LSHex = LSHex + 48
End If
                              'Copy selected bits according
                              'to active logic mode from
For i = 0 To 7                'checkboxes to text boxes.
   If EqualMode Or (ANDMode And (FormID!NewBit(i).Value = 0)) Or _
      (ORMode And (FormID!NewBit(i).Value = 1)) Then FormID!SavedBit(i).Text = FormID!NewBit(i).Value
   Next i MsgBox "Or Mode = " + Str$(ORMode) + "AND Mode = " + Str$(ANDMode) + "EQUAL Mode = " + Str$(EqualMode)

FormID!Data1.Recordset.Edit            'Save data to database.
FormID!Data1.Recordset.Fields("bit 0") = FormID!SavedBit(0).Text
FormID!Data1.Recordset.Fields("bit 1") = FormID!SavedBit(1).Text
FormID!Data1.Recordset.Fields("bit 2") = FormID!SavedBit(2).Text
FormID!Data1.Recordset.Fields("bit 3") = FormID!SavedBit(3).Text
FormID!Data1.Recordset.Fields("bit 4") = FormID!SavedBit(4).Text
FormID!Data1.Recordset.Fields("bit 5") = FormID!SavedBit(5).Text
```

Page 28

FormID!Data1.Recordset.Fields("bit 6") = FormID!SavedBit(6).Text
FormID!Data1.Recordset.Fields("bit 7") = FormID!SavedBit(7).Text
FormID!Data1.Recordset.Update If AltComment Then                   'Copy bit data of dual data line
   FormID!Data2.Recordset.Edit       'registers to main data line.
   FormID!Data2.Recordset.Fields("bit 0") = FormID!Data1.Recordset.Fields("bit 0")
   FormID!Data2.Recordset.Fields("bit 1") = FormID!Data1.Recordset.Fields("bit 1")
   FormID!Data2.Recordset.Fields("bit 2") = FormID!Data1.Recordset.Fields("bit 2")
   FormID!Data2.Recordset.Fields("bit 3") = FormID!Data1.Recordset.Fields("bit 3")
   FormID!Data2.Recordset.Fields("bit 4") = FormID!Data1.Recordset.Fields("bit 4")
   FormID!Data2.Recordset.Fields("bit 5") = FormID!Data1.Recordset.Fields("bit 5")
   FormID!Data2.Recordset.Fields("bit 6") = FormID!Data1.Recordset.Fields("bit 6")
   FormID!Data2.Recordset.Fields("bit 7") = FormID!Data1.Recordset.Fields("bit 7")
   FormID!Data2.Recordset.Update
End If PlaceCommentIntoCode FormID '* LIST OUTPUT IN REGISTER WINDOW *
FirstLine = True                'Initialize output layout variables.
CodeListed = False If AsmEnable Then               'Assembly language output...
  If EqualMode Then
     OutCodeTemp = "MOV #0"     ' --set equal to--
  ElseIf ANDMode Then
     OutCodeTemp = "AND #0"     ' --set zeros--
  ElseIf ORMode Then Page 29

```
            OutCodeTemp = "OR #0"          ' --set ones--
        End If
                                'Actual code without comments.
            OutCodeTemp = OutCodeTemp & Chr(MSHex) & Chr(LSHex) & "h, " &
        FormID!Data1.Recordset.Fields("ASM Identity")

While Len(OutCodeTemp) < 20    'Add spaces between code & comment.
                OutCodeTemp = OutCodeTemp & " "    'Comment starts at 21st column.
            Wend For i = 0 To 7                 'Output a comment line if it is
                If Not (OutputCodeComment(i) = "") Then  'not blank (8 maximum).
                    CodeListed = True If FirstLine Then      'Output code + comment on top line.
                        RegEdit!Text2.Text = RegEdit!Text2.Text & OutCodeTemp & ";" &
        OutputCodeComment(i) & Chr$(13) & Chr$(10)
                        FirstLine = False Else                   'Show comment only on rest of lines.
                        RegEdit!Text2.Text = RegEdit!Text2.Text & "                    ;" &
        OutputCodeComment(i) & Chr$(13) & Chr$(10)
                    End If
                End If
            Next i Else                               'C language output...
            If EqualMode Then
                OutCodeTemp = FormID!Data1.Recordset.Fields("C Identity") & " = 0X"   '--set
``` equal to--
    ElseIf ANDMode Then
        OutCodeTemp = FormID!Data1.Recordset.Fields("C Identity") & " & = 0X" '--set zeros--
    ElseIf ORMode Then
        OutCodeTemp = FormID!Data1.Recordset.Fields("C Identity") & " | = 0X" '--set ones--
    End If
                        'Actual code without comments.
    OutCodeTemp = OutCodeTemp & Chr(MSHex) & Chr(LSHex) & ";"

While Len(OutCodeTemp) < 20        'Add spaces between code & comment.
        OutCodeTemp = OutCodeTemp & " "      'Comment starts at 21st column.
    Wend For i = 0 To 7                'Output a comment line if it is
        If Not (OutputCodeComment(i) = "") Then 'not blank.
            CodeListed = True If FirstLine Then          'Output code + comment on top line.
                RegEdit!Text2.Text = RegEdit!Text2.Text & OutCodeTemp & "/* " & OutputCodeComment(i) & " */" & Chr$(13) & Chr$(10)
                FirstLine = False Else                'Show comment only on rest of lines.
                RegEdit!Text2.Text = RegEdit!Text2.Text & "                    /* " & OutputCodeComment(i) & " */" & Chr$(13) & Chr$(10)
            End If
        End If Page 31

```
        Next i
    End If

If Not CodeListed Then              'List code only if no comments exist.
        RegEdit!Text2.Text = RegEdit!Text2.Text & OutCodeTemp & Chr$(13) & Chr$(10)
    End If Unload FormID
End Sub Public Sub RegDEFAULT(FormID As Form)
    For i = 0 To 7
        FormID!NewBit(i).Value = Mid(FormID!Data1.Recordset.Fields("Default"), 8 - i, 1)
    Next i
End Sub Public Sub DisplayLines(FormID As Form, X As Integer, Y As Integer, State As Boolean)

'This function sets the visible property of grouping lines
'(used for Reserved bits) on the forms to either true or false,
'depending on the State variable.

For i = X To Y
        FormID!Line(i).Visible = State
    Next i
End Sub
```

Page 32

Public Sub RegSave16Bit(FormID As Form)

'Special save routine for the forms with 16 bits verses 8 bits
'Also this function required that the form have TWO DATA types
'Data1 and Data2 in order to function properly.

'Retrieve Comments for the 16-bit registers

ShowInitOutCode               'show initialization code, if needed.

PlaceCommentIntoCode16Bit FormID

```
    LSHex = 0                 'Convert results to hex numbers.
    MSHex = 0
    LS1Hex = 0
    MS1Hex = 0
    For i = 0 To 3
        LSHex = LSHex + Str$(FormID!NewBit(i) * 2 ^ i)
        MSHex = MSHex + Str$(FormID!NewBit(i + 4) * 2 ^ i)
        LS1Hex = LS1Hex + Str$(FormID!NewBit(i + 8) * 2 ^ i)
        MS1Hex = MS1Hex + Str$(FormID!NewBit(i + 12) * 2 ^ i)
    Next i 'Least Significant Bits
    If MSHex > 9 Then
```

```
      MSHex = MSHex + 55
   Else
      MSHex = MSHex + 48
   End If
   If LSHex > 9 Then
      LSHex = LSHex + 55
   Else
      LSHex = LSHex + 48
   End If
                     'Most Significant Bits
   If MS1Hex > 9 Then
      MS1Hex = MS1Hex + 55
   Else
      MS1Hex = MS1Hex + 48
   End If
   If LS1Hex > 9 Then
      LS1Hex = LS1Hex + 55
   Else
      LS1Hex = LS1Hex + 48
   End If For i = 0 To 15            'Copy checkboxes to text boxes.
     FormID!SavedBit(i).Text = FormID!NewBit(i).Value
   Next i FormID!Data1.Recordset.Edit      'Save data to database.
   FormID!Data1.Recordset.Fields("bit 0") = FormID!SavedBit(0).Text
   FormID!Data1.Recordset.Fields("bit 1") = FormID!SavedBit(1).Text
```

Page 34

```
FormID!Data1.Recordset.Fields("bit 2") = FormID!SavedBit(2).Text
FormID!Data1.Recordset.Fields("bit 3") = FormID!SavedBit(3).Text
FormID!Data1.Recordset.Fields("bit 4") = FormID!SavedBit(4).Text
FormID!Data1.Recordset.Fields("bit 5") = FormID!SavedBit(5).Text
FormID!Data1.Recordset.Fields("bit 6") = FormID!SavedBit(6).Text
FormID!Data1.Recordset.Fields("bit 7") = FormID!SavedBit(7).Text
FormID!Data1.Recordset.Update FormID!Data2.Recordset.Edit        'Save data to database.
FormID!Data2.Recordset.Fields("bit 0") = FormID!SavedBit(8).Text
FormID!Data2.Recordset.Fields("bit 1") = FormID!SavedBit(9).Text
FormID!Data2.Recordset.Fields("bit 2") = FormID!SavedBit(10).Text
FormID!Data2.Recordset.Fields("bit 3") = FormID!SavedBit(11).Text
FormID!Data2.Recordset.Fields("bit 4") = FormID!SavedBit(12).Text
FormID!Data2.Recordset.Fields("bit 5") = FormID!SavedBit(13).Text
FormID!Data2.Recordset.Fields("bit 6") = FormID!SavedBit(14).Text
FormID!Data2.Recordset.Fields("bit 7") = FormID!SavedBit(15).Text
FormID!Data2.Recordset.Update If AsmEnable Then
   FirstLine = True
        OutCodeTemp = "MOV #0" & Chr(MS1Hex) & Chr(LS1Hex) & "h, " & FormID!Data2.Recordset.Fields("ASM Identity")
     While Len(OutCodeTemp) < 20
        OutCodeTemp = OutCodeTemp & " "
     Wend
     For i = 8 To 15
        If Not (OutputCodeComment16Bit(i) = "") Then
```

Page 35

```
            If FirstLine Then
                    RegEdit!Text2.Text = RegEdit!Text2.Text & OutCodeTemp & ";" &
OutputCodeComment16Bit(i) & Chr$(13) & Chr$(10)
                FirstLine = False
            Else
                    RegEdit!Text2.Text = RegEdit!Text2.Text & "                    ;" &
OutputCodeComment16Bit(i) & Chr$(13) & Chr$(10)
            End If
        End If
    Next i
    If FirstLine Then RegEdit!Text2.Text = RegEdit!Text2.Text & OutCodeTemp &
Chr$(13) & Chr$(10)

FirstLine = True
        OutCodeTemp = "MOV #0" & Chr(MSHex) & Chr(LSHex) & "h, " &
FormID!Data1.Recordset.Fields("ASM Identity")
        While Len(OutCodeTemp) < 20
          OutCodeTemp = OutCodeTemp & " "
        Wend
        For i = 0 To 7
          If Not (OutputCodeComment16Bit(i) = "") Then
             If FirstLine Then
                    RegEdit!Text2.Text = RegEdit!Text2.Text & OutCodeTemp & ";" &
OutputCodeComment16Bit(i) & Chr$(13) & Chr$(10)
                FirstLine = False
            Else
                    RegEdit!Text2.Text = RegEdit!Text2.Text & "                    ;" &
OutputCodeComment16Bit(i) & Chr$(13) & Chr$(10)
            End If
```

Page 36

```
        End If
      Next i
      If FirstLine Then RegEdit!Text2.Text = RegEdit!Text2.Text & OutCodeTemp &
Chr$(13) & Chr$(10)

Else
      FirstLine = True
        OutCodeTemp = FormID!Data2.Recordset.Fields("C Identity") & " = 0X" &
Chr(MS1Hex) & Chr(LS1Hex) & ";"
      While Len(OutCodeTemp) < 20
        OutCodeTemp = OutCodeTemp & " "
      Wend
      For i = 8 To 15
        If Not (OutputCodeComment16Bit(i) = "") Then
          If FirstLine Then
            RegEdit!Text2.Text = RegEdit!Text2.Text & OutCodeTemp & "/* " &
OutputCodeComment16Bit(i) & " */" & Chr$(13) & Chr$(10)
            FirstLine = False
          Else
            RegEdit!Text2.Text = RegEdit!Text2.Text & "                              /* " &
OutputCodeComment16Bit(i) & " */" & Chr$(13) & Chr$(10)
          End If
        End If
      Next i
      If FirstLine Then RegEdit!Text2.Text = RegEdit!Text2.Text & OutCodeTemp &
Chr$(13) & Chr$(10)

FirstLine = True
      OutCodeTemp = FormID!Data1.Recordset.Fields("C Identity") & " = 0X" &
```

Page 37

```
        Chr(MSHex) & Chr(LSHex) & ";"
            While Len(OutCodeTemp) < 20
              OutCodeTemp = OutCodeTemp & " "
            Wend
            For i = 0 To 7
              If Not (OutputCodeComment16Bit(i) = "") Then
                If FirstLine Then
                      RegEdit!Text2.Text = RegEdit!Text2.Text & OutCodeTemp & "/* " &
OutputCodeComment16Bit(i) & " */" & Chr$(13) & Chr$(10)
                    FirstLine = False
                  Else
                      RegEdit!Text2.Text = RegEdit!Text2.Text & "                         /* " &
OutputCodeComment16Bit(i) & " */" & Chr$(13) & Chr$(10)
                End If
              End If
            Next i
            If FirstLine Then RegEdit!Text2.Text = RegEdit!Text2.Text & OutCodeTemp &
Chr$(13) & Chr$(10)
          End If Unload FormID End Sub Public Sub PlaceCommentIntoCode(FormID As Form)

Dim temp(0 To 7) As String
Dim BitID As String
Dim MaxLength As Byte
```

Page 38

```
For i = 0 To 7
  If FormID!NewBit(i).Enabled = True Then
    If EqualMode Or (ANDMode And (FormID!NewBit(i).Value = 0)) Or _
    (ORMode And (FormID!NewBit(i).Value = 1)) Then
      BitID = "bit " + Chr$(48 + i) + "-" + Chr$(48 + FormID!NewBit(i).Value)
      temp(i) = FormID!Data1.Recordset.Fields(BitID)
    Else
      temp(i) = "NC"
    End If
  Else
    temp(i) = "NC"
  End If
Next i MaxLength = 0
For i = 0 To 7
  If Not (temp(i) = "NC") Then
    If (Left$(temp(i), 5) = "CALC:") Then
      OutputCodeComment(i) = CalculateComment(temp(i), FormID)
    Else
      OutputCodeComment(i) = temp(i)
    End If
  Else
    OutputCodeComment(i) = ""
  End If
        If Len(OutputCodeComment(i)) > MaxLength Then MaxLength = Len(OutputCodeComment(i))
  Next i
```

Page 39

```
    For i = 0 To 7
      If Not OutputCodeComment(i) = "" Then
        While Len(OutputCodeComment(i)) < MaxLength
          OutputCodeComment(i) = OutputCodeComment(i) + " "
        Wend
      End If
    Next i
End Sub Public Function CalculateComment(OrigComment As String, FormID As Form) As
String
  Dim FirstEndPoint As String
  Dim SecondEndPoint As String
  Dim RoutineName As String FirstEndPoint = Mid$(OrigComment, 6, 1)
  SecondEndPoint = Mid$(OrigComment, 7, 1)
  RoutineName = Mid$(OrigComment, 8)

'Convert checkbox values to Base 10 index

For i = FirstEndPoint To SecondEndPoint
          CommentIndex = CommentIndex + FormID!NewBit(i).Value * 2 ^ (i -
FirstEndPoint)
    Next i
```

Page 40

' This routine is for the T2CTL1 bits 1 & 2 and T1CTL1 bits 0-2 and 4-6

If Left$(RoutineName, 6) = "ClkSrc" Then
    Select Case CommentIndex
        Case 0
            If OscFreq = 0 Then
                CalculateComment = Mid$(RoutineName, 8) + "Counter Source = 4 / Oscillator Frequency"
            Else
                CalculateComment = Mid$(RoutineName, 8) + "Counter Source = " + Format((4 / OscFreq), "#0.0##") + " ¦s"
            End If
        Case 1
            CalculateComment = Mid$(RoutineName, 8) + "Counter Source = Pulse Accumulation"
        Case 2
            CalculateComment = Mid$(RoutineName, 8) + "Counter Source = Event Input"
        Case 3
            CalculateComment = Mid$(RoutineName, 8) + "Counter Source = No Clock"
        Case 4
            If OscFreq = 0 Then
                CalculateComment = Mid$(RoutineName, 8) + "Counter Source = 16 / Oscillator Frequency"
            Else
                CalculateComment = Mid$(RoutineName, 8) + "Counter Source = " + Format((16 / OscFreq), "#0.0##") + " ¦s"
            End If
        Case 5

```
            If OscFreq = 0 Then
                CalculateComment = Mid$(RoutineName, 8) + "Counter Source = 64 /
Oscillator Frequency"
            Else
                CalculateComment = Mid$(RoutineName, 8) + "Counter Source = " +
Format((64 / OscFreq), "#0.0##") + " ¼s"
            End If
        Case 6
            If OscFreq = 0 Then
                CalculateComment = Mid$(RoutineName, 8) + "Counter Source = 256 /
Oscillator Frequency"
            Else
                CalculateComment = Mid$(RoutineName, 8) + "Counter Source = " +
Format((256 / OscFreq), "#0.0##") + " ¼s"
            End If
        Case 7
            If OscFreq = 0 Then
                CalculateComment = Mid$(RoutineName, 8) + "Counter Source = 1024 /
Oscillator Frequency"
            Else
                CalculateComment = Mid$(RoutineName, 8) + "Counter Source = " +
Format((1024 / OscFreq), "#0.0##") + " ¼s"
            End If
        Case Else
            MsgBox "Error has occurred [CalculateComment]!"
    End Select
```

Page 42

'This section is for SPICCR and SCICCR bits 0-2

ElseIf Left$(RoutineName, 7) = "CharLen" Then
    CalculateComment = Mid$(RoutineName, 9) + "Character length = " + Str$(CommentIndex + 1)

'This section is for SPICCR bits 3-5

ElseIf RoutineName = "ClkFrq" Then
    CalculateComment = "SPI Bit Transfer Rate = "
    If OscFreq = 0 Then
        CalculateComment = CalculateComment + "CLKIN / " + Format(8 * 2 ^ CommentIndex)
    Else
        CalculateComment = CalculateComment + Format((OscFreq * 1000 / (8 * 2 ^ CommentIndex)), "0.####") + " KBits/s"
    End If 'This section is for ADCTL bits 0-2

ElseIf RoutineName = "ChanSel" Then
    CalculateComment = "Input Channel = Pin AN" + Format(CommentIndex)

'This section is for ADCTL bits 3-5
ElseIf RoutineName = "VrefSrc" Then

Page 43

```
    If CommentIndex = 0 Then
        CalculateComment = "Voltage Reference Source = Vcc3"
    Else
                CalculateComment = "Voltage Reference Source = Pin AN" +
Format(CommentIndex)
    End If Else
    MsgBox "Error has occured [CalculateComment]!!"
End If End Function
Public Sub PlaceCommentIntoCode16Bit(FormID As Form)

Dim temp(0 To 15) As String
Dim BitID As String

For i = 0 To 7
    If FormID!NewBit(i).Enabled = True Then
      BitID = "bit " + Chr$(48 + i) + "-" + Chr$(48 + FormID!NewBit(i).Value)
      temp(i) = FormID!Data1.Recordset.Fields(BitID)
    Else
      temp(i) = "NC"
    End If If FormID!NewBit(i + 8).Enabled = True Then
      BitID = "bit " + Chr$(48 + i) + "-" + Chr$(48 + FormID!NewBit(i + 8).Value)
      temp(i + 8) = FormID!Data2.Recordset.Fields(BitID)
    Else
```

```
      temp(i + 8) = "NC"
    End If
  Next i

For i = 0 To 15
    If Not (temp(i) = "NC") Then
      If (Left$(temp(i), 5) = "CALC:") Then
        OutputCodeComment16Bit(i) = CalculateComment16Bit(temp(i), FormID)
      Else
        OutputCodeComment16Bit(i) = temp(i)
      End If
    Else
      OutputCodeComment16Bit(i) = ""
    End If
  Next i End Sub Public Function CalculateComment16Bit(OrigComment As String, FormID As Form)
As String Dim RoutineName As String
  Dim InputClockMode As Byte
  Dim TimeFactor As Single RoutineName = Mid$(OrigComment, 6)

CalculatedValue = 0
```

```
For i = 0 To 15
   CalculatedValue = CalculatedValue + FormID!NewBit(i).Value * 2 ^ i
Next i If RoutineName = "Counter" Then
   CalculateComment16Bit = "Set Counter = " + Format(CalculatedValue)

ElseIf RoutineName = "Baud" Then
   If SCICCR!Data1.Recordset.Fields("bit 4") = 1 Then  'If Asynchronous ...
      If OscFreq > 0 Then
         TempFreq = ((((OscFreq * 10 ^ 6) / ((CalculatedValue + 1) * 128))) / 10 ^ 6
         RangeLabel = "MHz"
         If TempFreq < 1 Then         'Show the asynchronous SCI baud rate
            TempFreq = TempFreq * 1000    'in a proper unit range.
            RangeLabel = "KHz"
            If TempFreq < 1 Then
               TempFreq = TempFreq * 1000
               RangeLabel = "Hz"
            End If
         End If
         CalculateComment16Bit = "Baud Rate = " + Format(TempFreq, "#0.000 ") + RangeLabel Else                    'Error message for no OscFreq preset.
         CalculateComment16Bit = "Baud Rate Register Value = " + Format(CalculatedValue)
```

Page 46

```
        End If

Else                    'If Isosynchronous ...
        If OscFreq > 0 Then
            TempFreq = ((((OscFreq * 10 ^ 6) / ((CalculatedValue + 1) * 8))) / 10 ^ 6
            RangeLabel = "MHz"
            If TempFreq < 1 Then        'Show isosynchronous SCI baud rate
                TempFreq = TempFreq * 1000      'in a proper unit range.
                RangeLabel = "KHz"
                If TempFreq < 1 Then
                    TempFreq = TempFreq * 1000
                    RangeLabel = "Hz"
                End If
            End If
            CalculateComment16Bit = "Baud Rate = " + Format(TempFreq, "#0.0000 ") + RangeLabel Else                    'Error message for no OscFreq present.
            CalculateComment16Bit = "Baud  Rate  Register  Value  = " + Format(CalculatedValue)
        End If
    End If ElseIf Left$(RoutineName, 5) = "Timer" Then 'For both Timer modules.
    If FormID.TimeForComment = 0 Then       ' Show counter value, or...
        CalculateComment16Bit = Mid$(RoutineName, 7) + Format(CalculatedValue, " 0")
    ElseIf FormID.TimeForComment > 1000 Then ' show elapsed time from TCounter.
```

Page 47

```
                              CalculateComment16Bit   =   Mid$(RoutineName,  7)  +
Format(FormID.TimeForComment / 1000, " 0.0###") + "s"
    Else
                              CalculateComment16Bit   =   Mid$(RoutineName,  7)  +
Format(FormID.TimeForComment, " 0.0###") + "ms"
    End If Else
    MsgBox "Error has occurred [CalculateComment16Bit]!"
  End If
End Function Private Sub ShowInitOutCode()         'Show initialization code required
  If Not StartupCodeShown Then        'for language selected, if any.
    If AsmEnable Then                 ' Assembly version...
      RegEdit!Data1.RecordSource = "select * from EditorStartupOutputCode where
designation = 'ASM Start'"
      RegEdit!Data1.Refresh
      If Not (RegEdit!Data1.Recordset.Fields("OutputCode") = "NC") Then
        RegEdit!Text2.Text = RegEdit!Data1.Recordset.Fields("OutputCode") + "  ;" +
RegEdit!Data1.Recordset.Fields("OutputComment") + Chr$(13) + Chr$(10) + Chr$(13)
+ Chr$(10)
      Else
        RegEdit!Text2.Text = ""
      End If
    Else                              ' C version...
      RegEdit!Data1.RecordSource = "select * from EditorStartupOutputCode where
designation = 'C Start'"
      RegEdit!Data1.Refresh
```

Page 48

```
If Not (RegEdit!Data1.Recordset.Fields("OutputCode") = "NC") Then
    RegEdit!Text2.Text = RegEdit!Data1.Recordset.Fields("OutputCode") + "   /* 
" + RegEdit!Data1.Recordset.Fields("OutputComment") + " */" + Chr$(13) + Chr$(10) 
+ Chr$(13) + Chr$(10)
    Else
        RegEdit!Text2.Text = ""
    End If
  End If
  StartupCodeShown = True         'Startup code is in the register
 End If                           'editor screen.
End Sub
```

The foregoing program makes function calls where needed. Consequently, in order to implement the "Save," "Reset," and "Cancel" buttons macros are used in order to give the user easier access to programming routines which are run a multiple number of times.

The database used to hold register information in conjunction with the information entered into the forms discussed above is Access®2.0. The database holds the default values for the registers as well as the comments for all register values. This is a commonly used personal computer-resident data base. Consequently, database information (e.g., register information can be updated by foregoing discussed display forms or externally using Access®2.0 without the need to use Visual Basic®. Therefore, the invention provides a Visual Basic® front-end and an Access®2.0 rear-end. This Access® data base provides for entity and referential integrity and it is data independent in that the front-end will work properly regardless of the data in the database file, provided that the data in the file has valid data. The database file used with the invention is named regedit.mdb. The software corresponding to the reports (Reports) option (file name regedit.rpt—which is a Crystal Reports file) can be edited to reflect a particular user's specification, although, the user will need Visual Basic® or Crystal Reports® to perform any changes to this file. One advantage of the invention is its use of widely known programming languages to accomplish form creation and data storage, e.g. Visual Basic®, Access®, Crystal Reports®, etc. Register information can be altered by modifying the database in Access® on which register information is stored. Additionally, provided the source code, a software developer need not learn additional programming languages in order to customize the register initialization programs. Further, the invention provides a development tool that uses a substantially minimum amount of memory in comparison with applications such as Motorola's MCUinit®.

The programs of the invention were written as a 16-bit application which are fully compatible with Windows3.x®, Windows 95®, Windows NT3.x®, Windows NT 4.x®, and Windows NT Workstation®. The invention's programs are fitted easily on a few computer diskettes without modification being necessary for running these distribution disks on the foregoing Windows® operating environments. The programs of the invention output source code and comments in at least two different languages, C and Assembly. The source code represents the initialization of the registers in the TMS370 family of microcontrollers. In its preferred embodiment, the invention has modular source code which incorporates the use of functions. Comments within each function should be calculated to provide information so as to ensure the possibility of readily making changes to the programs in the future as needed. The comments are dynamic comments in that they will vary depending on the configuration of a particular register.

Information from the foregoing development tool which is supplied to the microcontroller's main program (the program selected to execute the desired functions) and includes the main program, need only be assembled, compiled and/or linked and downloaded to the desired microcontroller in order to input the desired register information in conjunction with running the main program.

Forms generated by the foregoing described invention can be made in conjunction with programming in the aforementioned languages using well-known programming techniques.

Although the invention has been described in detail herein with reference to its preferred embodiment, it is to be understood that this description is by way of example only and is not to be construed in a limiting sense. It is to be further understood that numerous changes in the details of the embodiments of the invention, will be apparent to and may be made by persons of ordinary skill in the art having reference to this description. For instance, a limited number of forms can be generated by software (i.e., 2 forms), which can be adapted to supply information for all registers rather than providing a distinct form per each register. Additionally, the foregoing described invention can be adapted for use with future generations of software, ( e.g., involving the C language) and/or future generations of microcontrollers. It is contemplated that all such changes and additional embodiments are within the true scope and spirit of the invention as claimed below.

We claim:

1. A software development tool, operable to run on a computer for microcontrollers comprising: a plurality of Windows®-based computer forms generated by programs which are commercially-available and non-proprietary to the microcontroller manufacturer, operable to generate code, of a selected language, capable of programming information into selected registers of a microcontroller in connection with information entered into said forms from a computer, said development tool being operable to insert said code into a selected location of a main program of said microcontroller without the use of an emulator.

2. A software development tool as recited in claim 1 wherein said microcontrollers are from a Texas Instruments Inc. family of microcontrollers.

3. A software development tool as recited in claim 2 wherein said development tool provides a function selected from the functions consisting of providing said code to initialize selected registers, proving said code to edit said registers, inserting said code into said main program or a combination thereof.

4. A software development tool as recited in claim 2 wherein register initialization forms are generated for functions selected from the functions consisting of System Reset, System Control, Digital Input/Output, External Interrupt Control, Data EEPROM Control, Program EPROM Control, Timere1, Timer 2, Serial Communication Interface, Serial Peripheral Interface, Analog-to-Digital Converter of a combination thereof.

5. A software development tool, operable to run on a computer, for microcontrollers comprising: a plurality of Windows®-based computer forms generated by programs which are commercially-available and non-proprietary to the microcontroller manufacturer, operable to generate code, of a language selected from the languages consisting of assembly, C, or a variation thereof, capable of programming information into selected registers of a microcontroller in connection with information entered into said forms from a computer, said development tool being operable to insert said code into a selected location of a main program of said microcontroller without the use of an emulator.

6. A software development tool for microcontrollers as recited in claim 5 wherein said forms provide register information in conjunction with software buttons, icons and pull-down menus.

7. A software development tool for microcontrollers as recited in claim 5 wherein said microcontrollers are from a Texas Instruments Inc. family of microcontrollers.

8. A software development tool for microcontrollers as recited in claim 6 wherein function calls are implemented within said programs to generate common form functions.

9. A software development tool for microcontrollers as recited in claim 8 wherein said common form functions are generated in conjuction with using a plurality of global variables and subroutines.

10. A software development tool as recited in claim 9 wherein said global variables are used in conjuction with transferring information concerning program states and universal data between program routines and register initialization forms.

11. A software development tool as recited in claim 9 wherein said subroutines are used in conjuction with form intialization and register bit data transfer and recording.

12. A software development tool as recited in claim 11 wherein said subroutines are further used in conduction with generating output code comments.

13. A software development tool as recited in claim 5 wherein a single form is generated with selectable programming options as determined by the register to be programmed.

14. A register editing microcontroller development tool as recited in claim 5, operable to program data into select registers, said tool including means to generate register editing code and means to copy said register editing code into a selected location of a main program.

15. A register editing microcontroller development tool as recited in claim 14 wherein said microcontroller is a microcontroller from the family of Texas Instruments Inc. microcontrollers.

16. A register editing microcontroller development tool as recited in claim 14 which is further operable to generate a plurality of visual display forms.

17. A register editing microcontroller development tool as recited in claim 16 wherein said forms are defined by Visual Basic® computer commands.

18. A register editing microcontroller development tool as recited in claim 14 which provides agraphical user interface.

19. A computer-implemented method for providing register initiation code for a microcontroller comprising the steps of entering register information into a display register form using visual basic in a micro-controller development tool; causing said tool to generate register initiating code; and, within said tool, copying said code to a selected location within a main program.

20. A method as recited in claim 19 wherein said microcontroller development tool is operable with microcontrollers from a family of Texas Instruments Incorporated microcontrollers.

\* \* \* \* \*